United States Patent
Kim et al.

(10) Patent No.: US 11,015,279 B2
(45) Date of Patent: May 25, 2021

(54) CLUTCH ASSEMBLY OF WASHING MACHINE

(71) Applicant: SAMSUNG ELECTRONICS CO., LTD., Suwon-si (KR)

(72) Inventors: Yong-Kwon Kim, Yongin-si (KR); Sang Up Lee, Yongin-si (KR); Young Jin Um, Suwon-si (KR); Yongjie Jin, Suwon-si (KR); Sang Yeon Pyo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 16/068,164

(22) PCT Filed: Jan. 6, 2017

(86) PCT No.: PCT/KR2017/000213
§ 371 (c)(1),
(2) Date: Jul. 5, 2018

(87) PCT Pub. No.: WO2017/119774
PCT Pub. Date: Jul. 13, 2017

(65) Prior Publication Data
US 2019/0017211 A1   Jan. 17, 2019

(30) Foreign Application Priority Data

Jan. 6, 2016  (KR) .................. 10-2016-0001475
Aug. 29, 2016  (KR) .................. 10-2016-0110322

(51) Int. Cl.
*D06F 37/40*  (2006.01)
*D06F 37/24*  (2006.01)
(Continued)

(52) U.S. Cl.
CPC ............. *D06F 37/40* (2013.01); *H02K 7/108* (2013.01); *D06F 21/00* (2013.01); *D06F 37/12* (2013.01); *D06F 37/24* (2013.01); *D06F 37/38* (2013.01)

(58) Field of Classification Search
CPC .......... D06F 37/12; D06F 37/24; D06F 37/40; D06F 2700/057; H02K 7/108
See application file for complete search history.

(56) References Cited

U.S. PATENT DOCUMENTS

| 6,176,108 B1 * | 1/2001 | Bae ..................... D06F 37/40 68/23.7 |
| 2003/0131636 A1 * | 7/2003 | Lim ..................... D06F 37/40 68/23.7 |

(Continued)

FOREIGN PATENT DOCUMENTS

| CN | 101446017 A | 6/2009 |
| CN | 202559115 U | 11/2012 |

(Continued)

OTHER PUBLICATIONS

International Search Report, PCT/ISA/210, dated Apr. 19, 2017, in corresponding International Patent Application No. PCT/KR2017/000213.

(Continued)

*Primary Examiner* — Joseph L. Perrin
(74) *Attorney, Agent, or Firm* — Staas & Halsey LLP

(57) ABSTRACT

A washing machine includes a motor for generating power and a clutch assembly that receives the power from the motor and drives a drum and a pulsator. The clutch assembly includes a driving shaft that receives the power from the motor and rotates, a pulsator drive portion selectively receiving the power from the driving shaft to rotate the pulsator, and a drum driving portion selectively receiving the power from the driving shaft to rotate the drum, The clutch (Continued)

assembly is provided to selectively drive a driving portion of at least one of the drum driving portion and the pulsator drive portion. With this configuration, the washing machine capable of running various modes of a washing mode and dehydration mode is implemented.

19 Claims, 22 Drawing Sheets

(51) Int. Cl.
*D06F 37/12* (2006.01)
*H02K 7/108* (2006.01)
*D06F 21/00* (2006.01)
*D06F 37/38* (2006.01)

(56) References Cited

U.S. PATENT DOCUMENTS

| | | | |
|---|---|---|---|
| 2005/0166643 A1* | 8/2005 | Cho | D06F 37/304 68/12.02 |
| 2005/0223754 A1* | 10/2005 | Choi | D06F 37/304 68/3 R |
| 2012/0222454 A1 | 9/2012 | Park | |
| 2013/0199247 A1* | 8/2013 | Lee | D06F 37/30 68/131 |
| 2014/0069145 A1 | 3/2014 | Chupka et al. | |
| 2015/0184330 A1* | 7/2015 | Lee | D06F 37/30 68/23.6 |
| 2016/0010265 A1* | 1/2016 | Jang | D06F 37/30 310/71 |
| 2016/0130739 A1* | 5/2016 | Song | D06F 37/40 8/137 |
| 2017/0152626 A1* | 6/2017 | Tsuji | D06F 39/14 |

FOREIGN PATENT DOCUMENTS

| | | |
|---|---|---|
| CN | 104631048 A | 5/2015 |
| JP | 2000-42286 | 2/2000 |
| KR | 10-2013-0090164 | 8/2013 |
| KR | 10-2015-0008347 | 1/2015 |
| KR | 10-2015-0075833 | 7/2015 |
| WO | WO 2004/069020 A2 | 8/2004 |
| WO | WO 2004/069020 A3 | 8/2004 |
| WO | WO 2015/188683 A1 | 12/2015 |

OTHER PUBLICATIONS

Written Opinion, PCT/ISA/237, dated Apr. 19, 2017, in corresponding International Patent Application No. PCT/KR2017/000213.
European Office Action dated Nov. 6, 2018 in European Patent Application No. 17736146.6.
Office Action dated Apr. 21, 2020 in corresponding Chinese Patent Application No. 201780007501.4.
Chinese Office Action dated Dec. 9, 2020, in corresponding Chinese Patent Application No. 201780007501.4.

* cited by examiner

[Fig. 1]
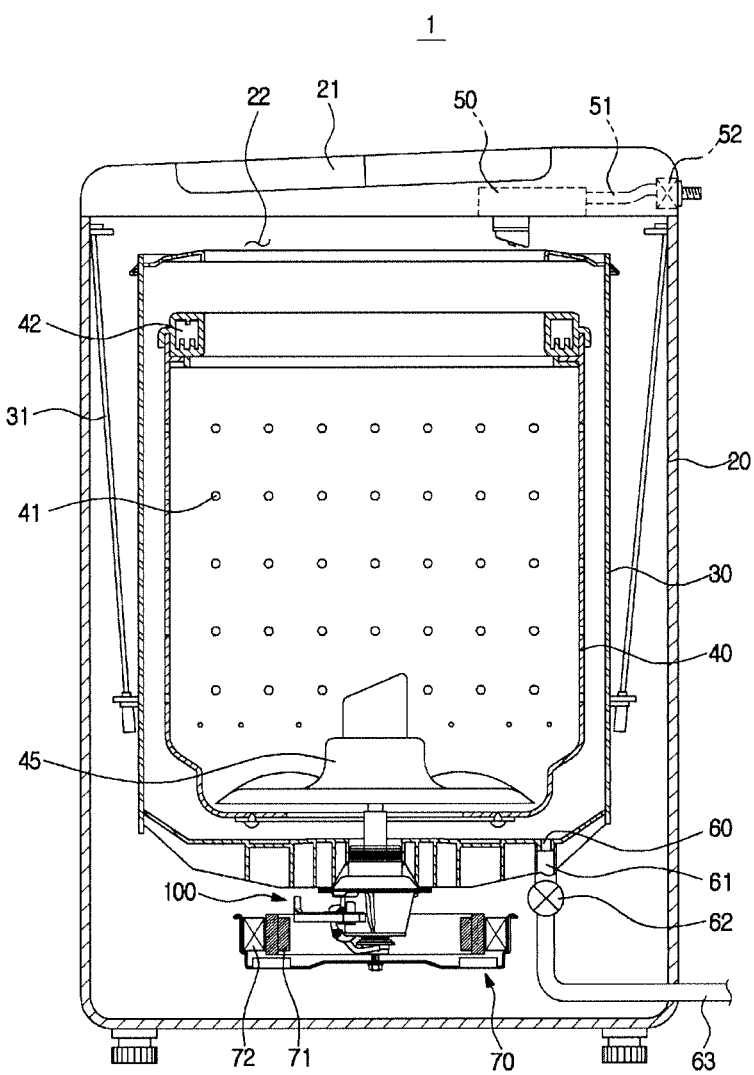

[Fig. 3]
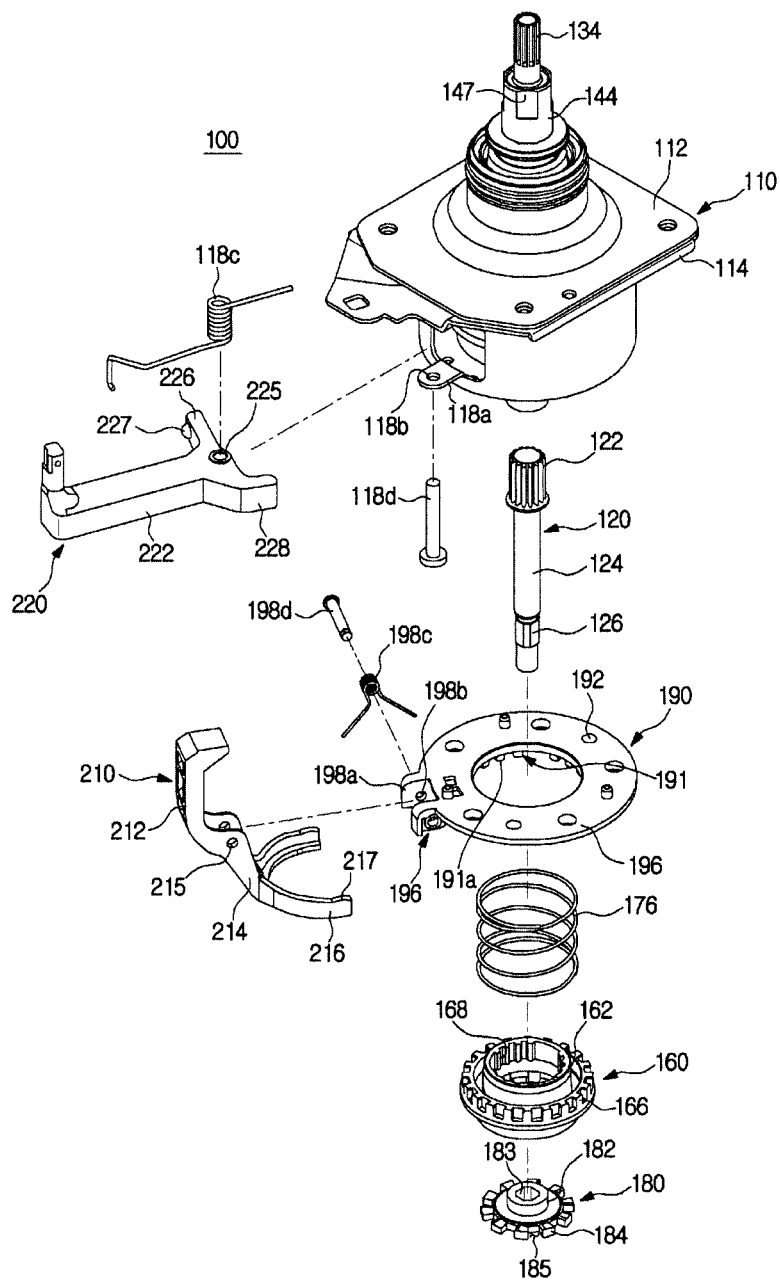

[Fig. 4]
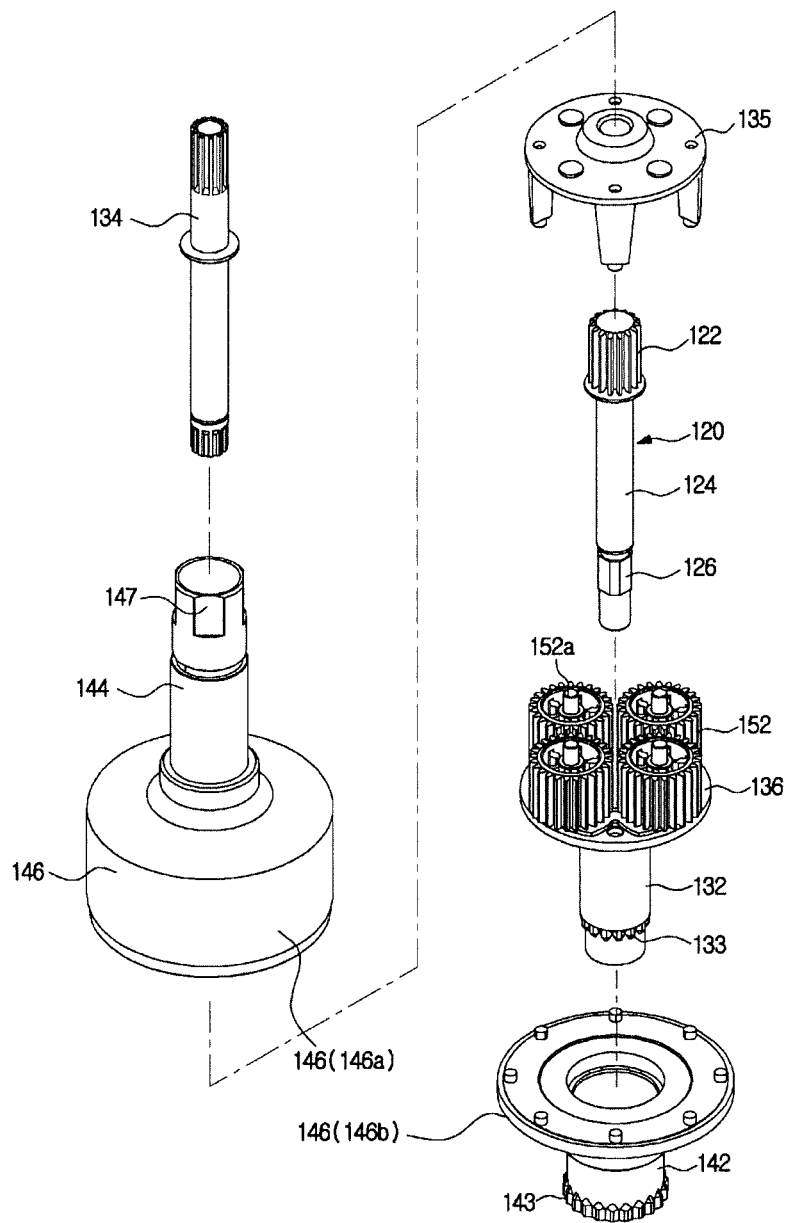

[Fig. 5]
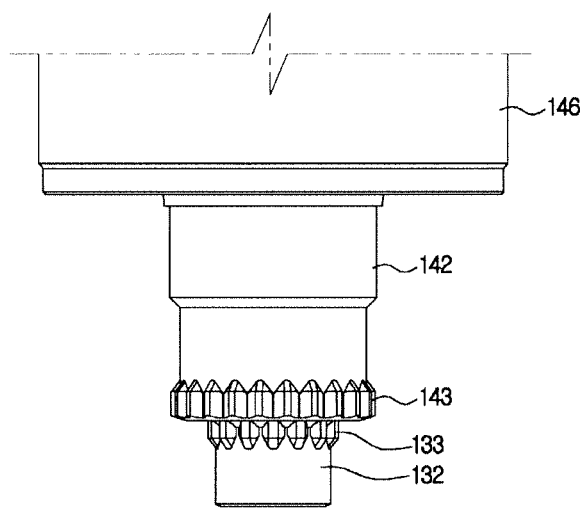

[Fig. 6]
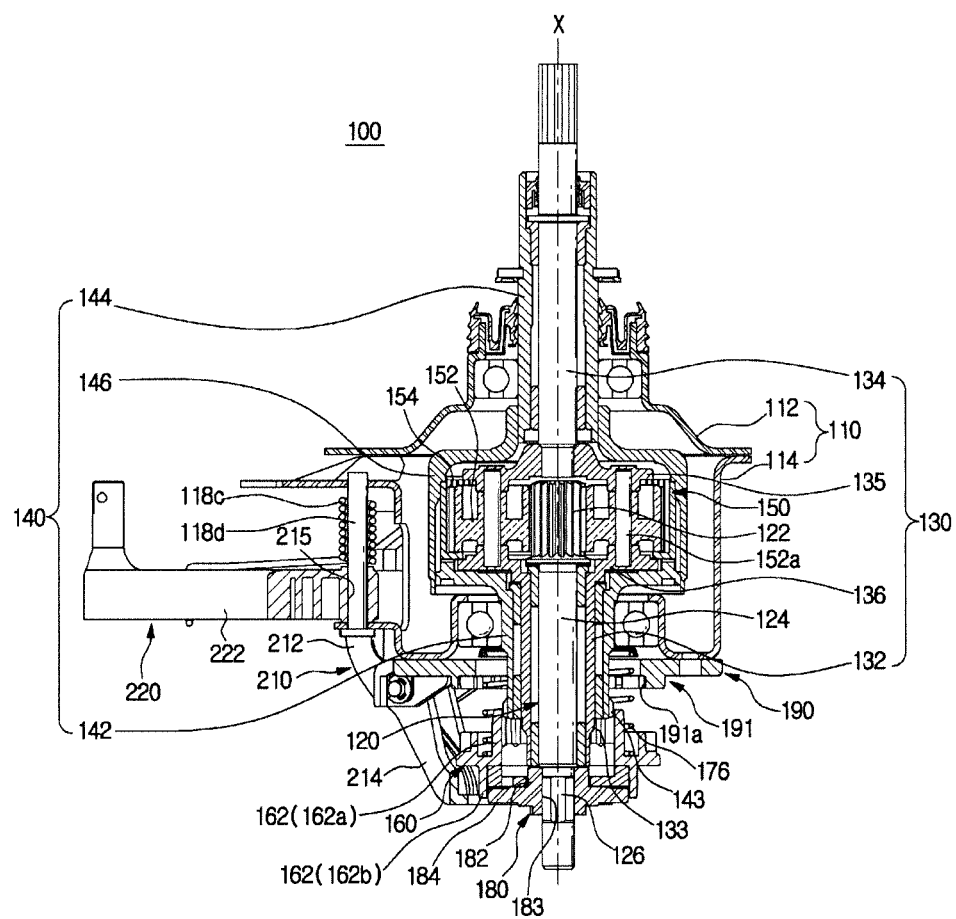

[Fig. 7]
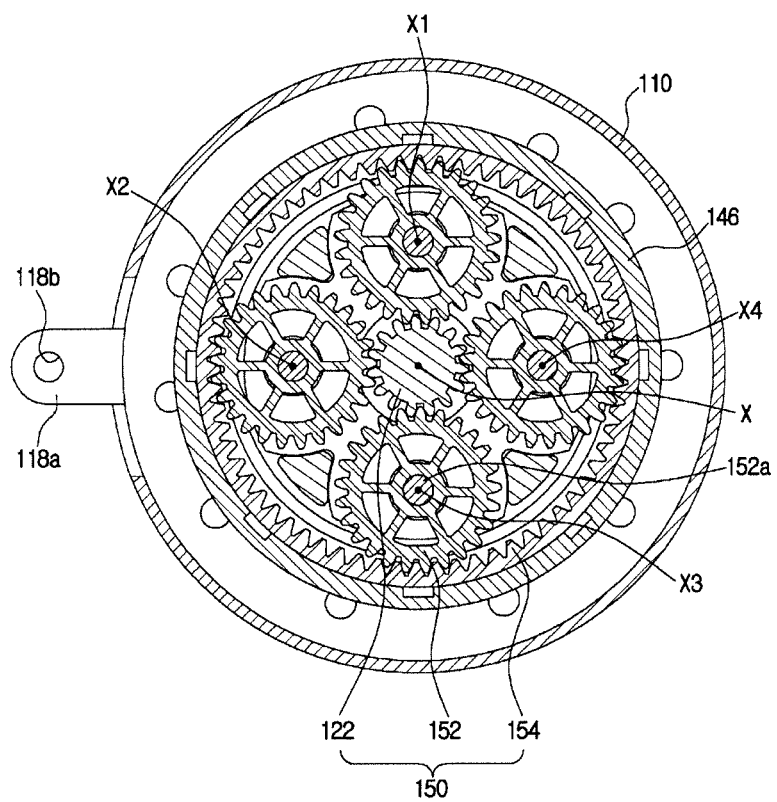

【Fig. 8】
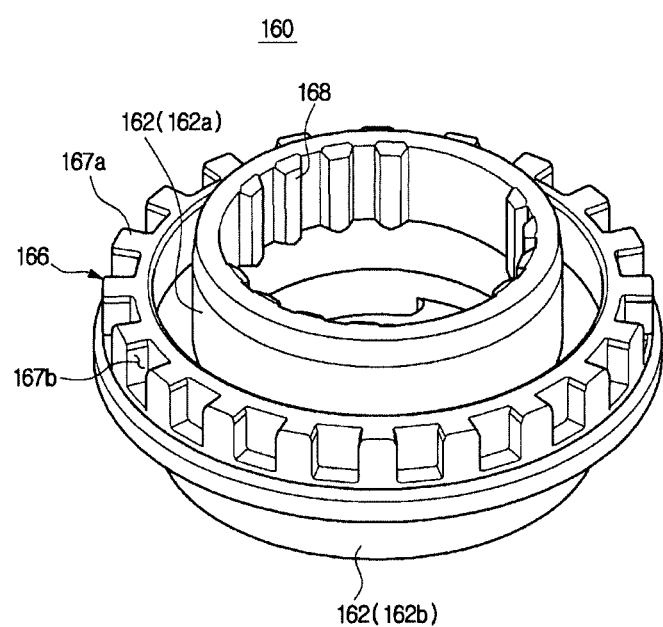

[Fig. 9]
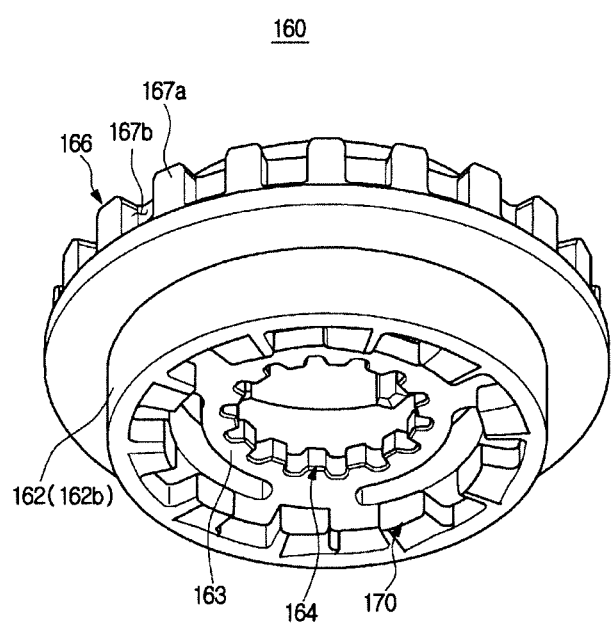

[Fig. 10]
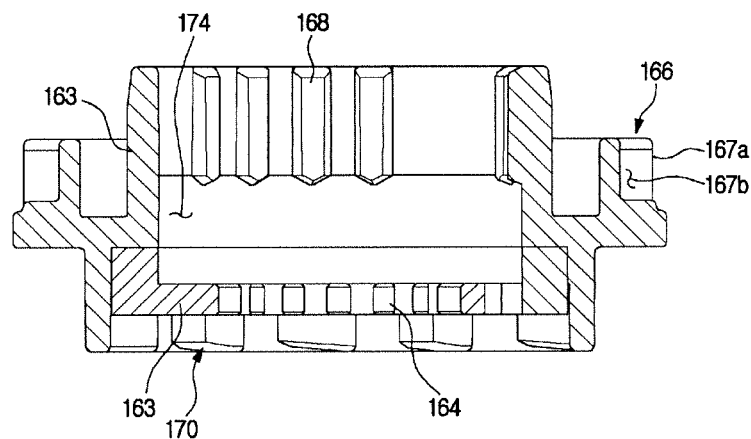

[Fig. 11]
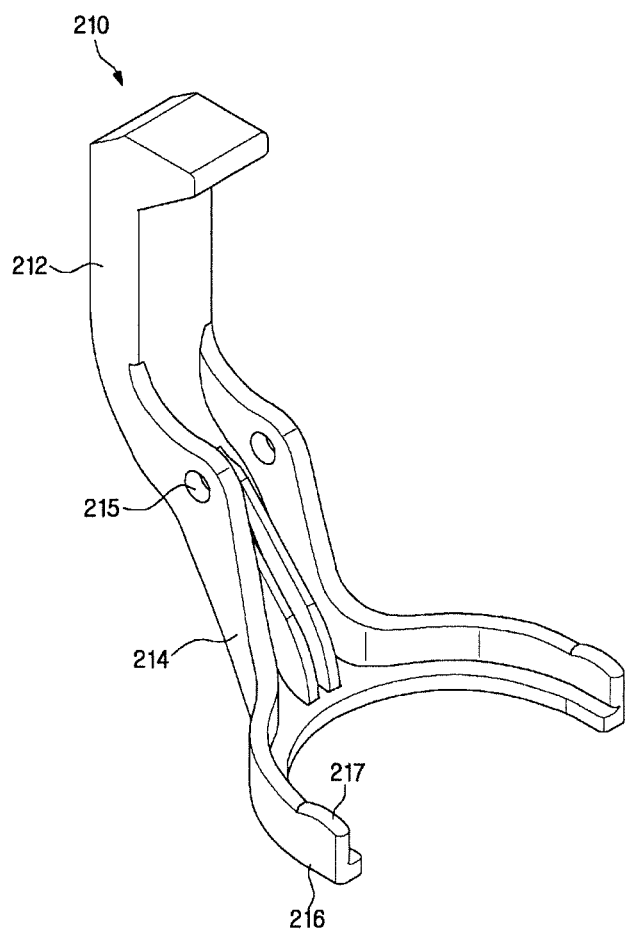

[Fig. 12]
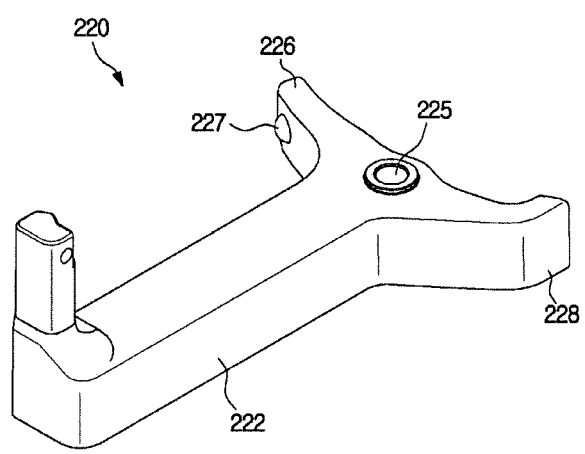

【Fig. 13】
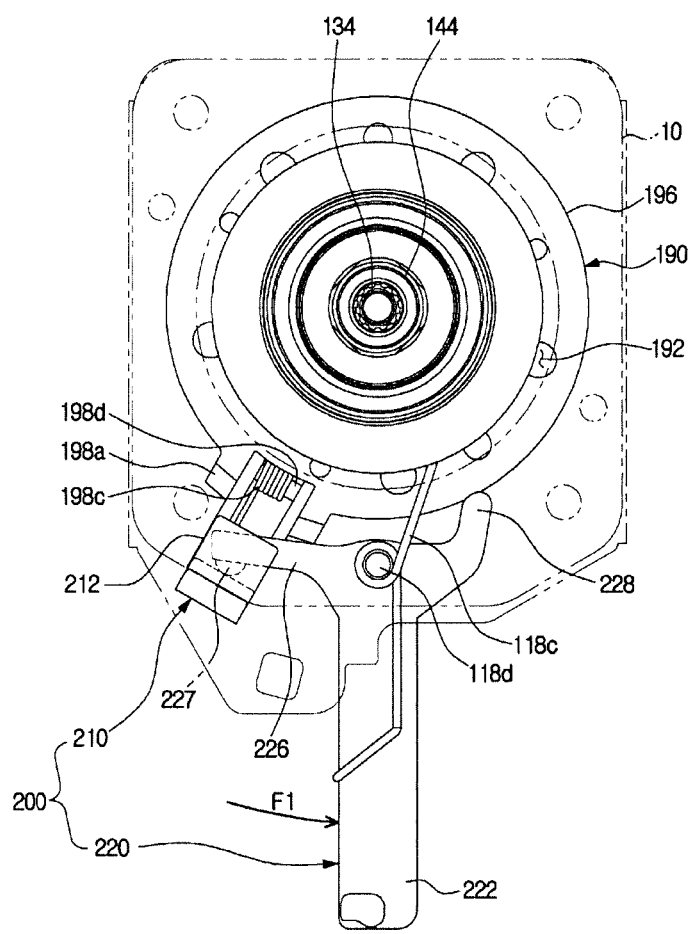

[Fig. 14]
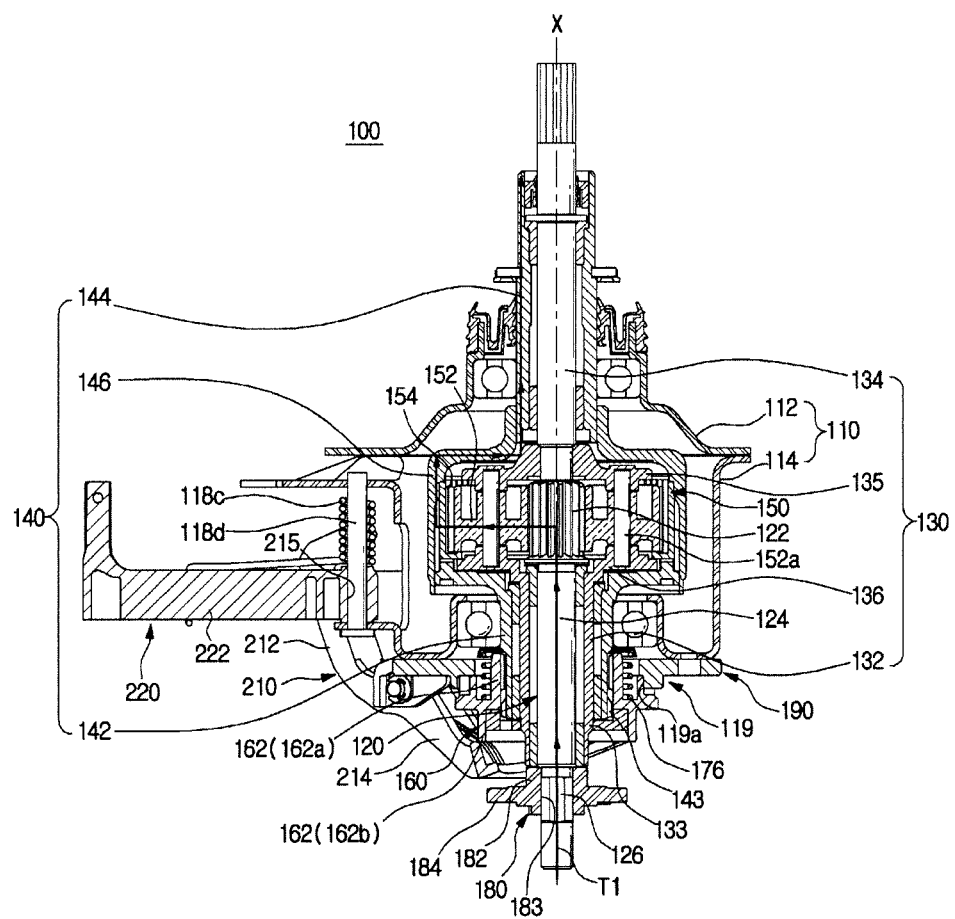

[Fig. 15]
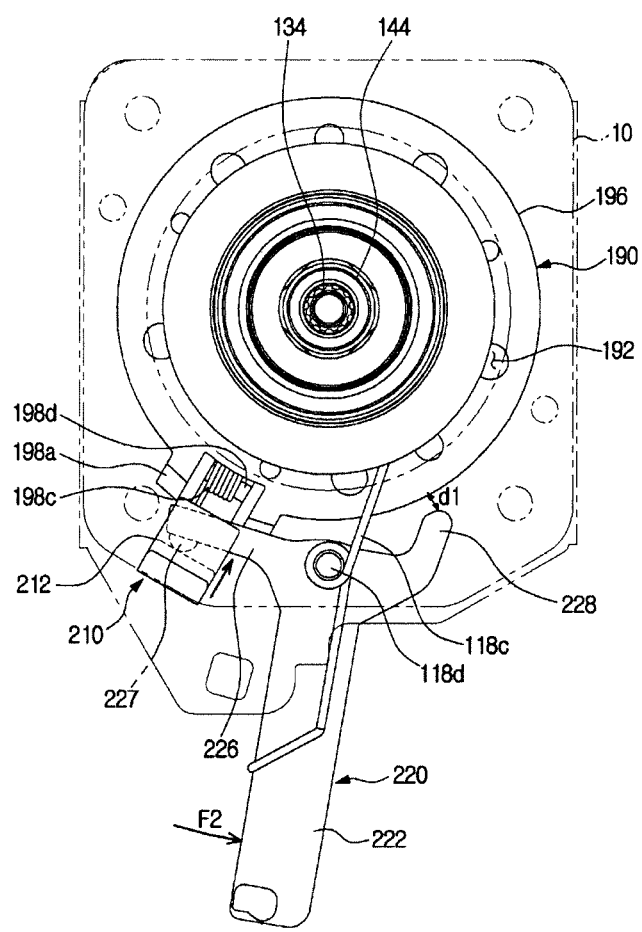

[Fig. 16]
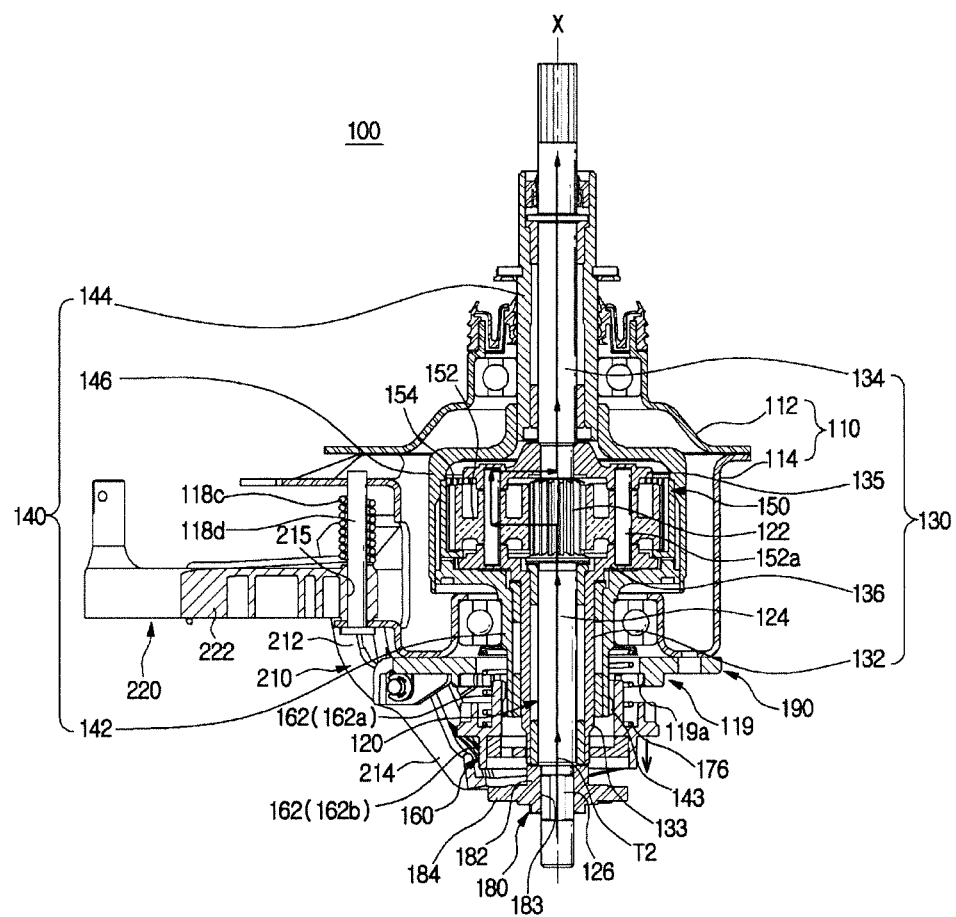

[Fig. 17]
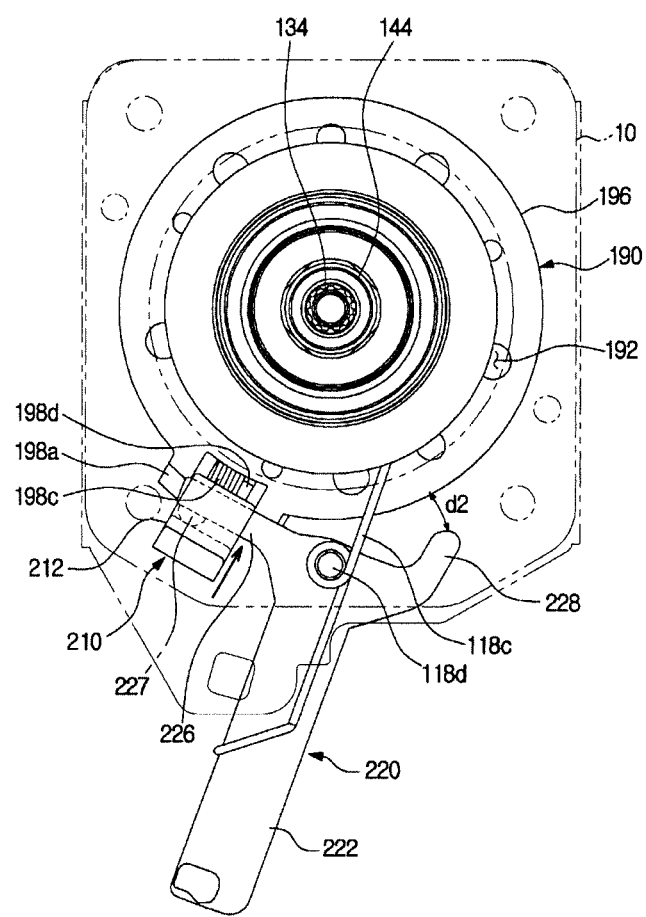

[Fig. 18]
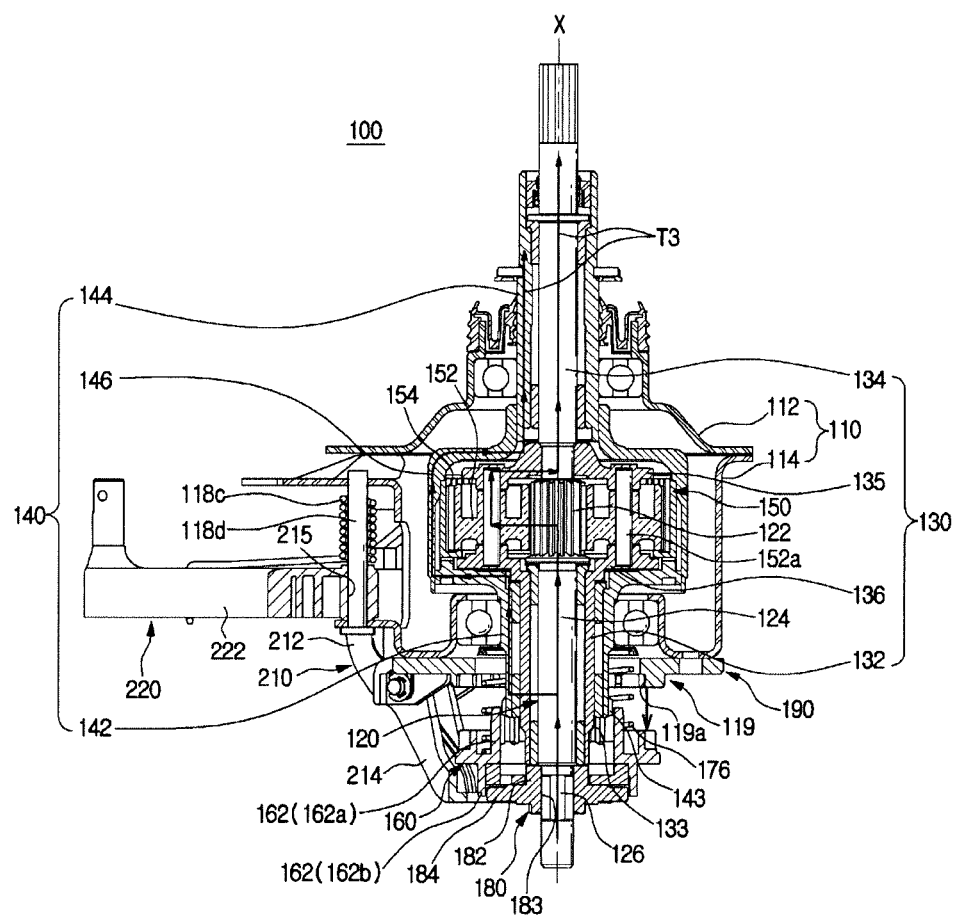

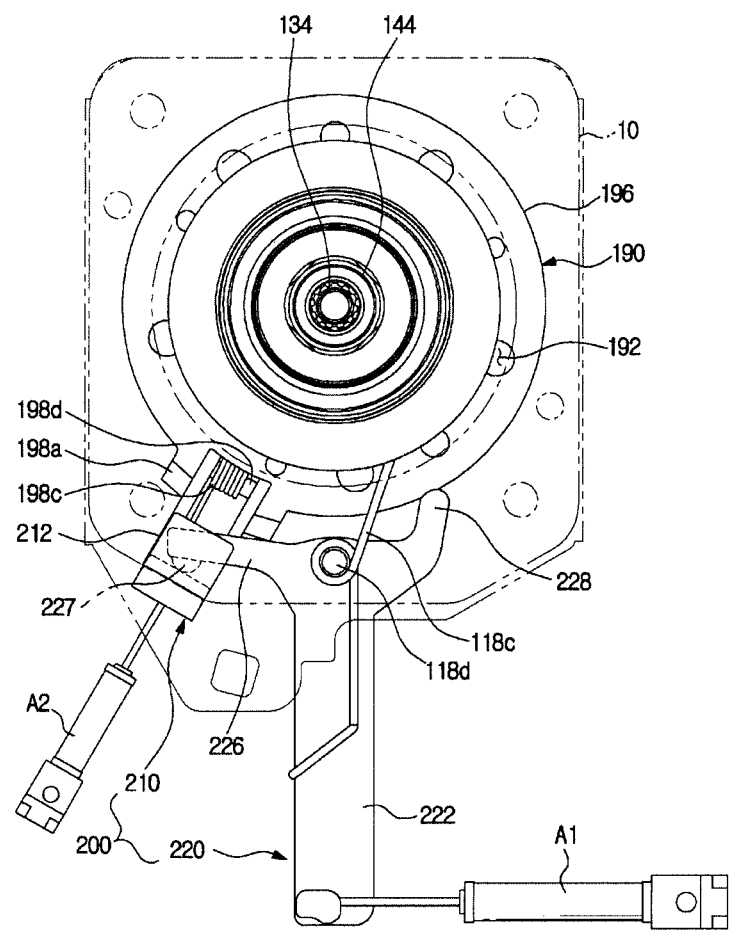
[Fig. 19]

[Fig. 20]
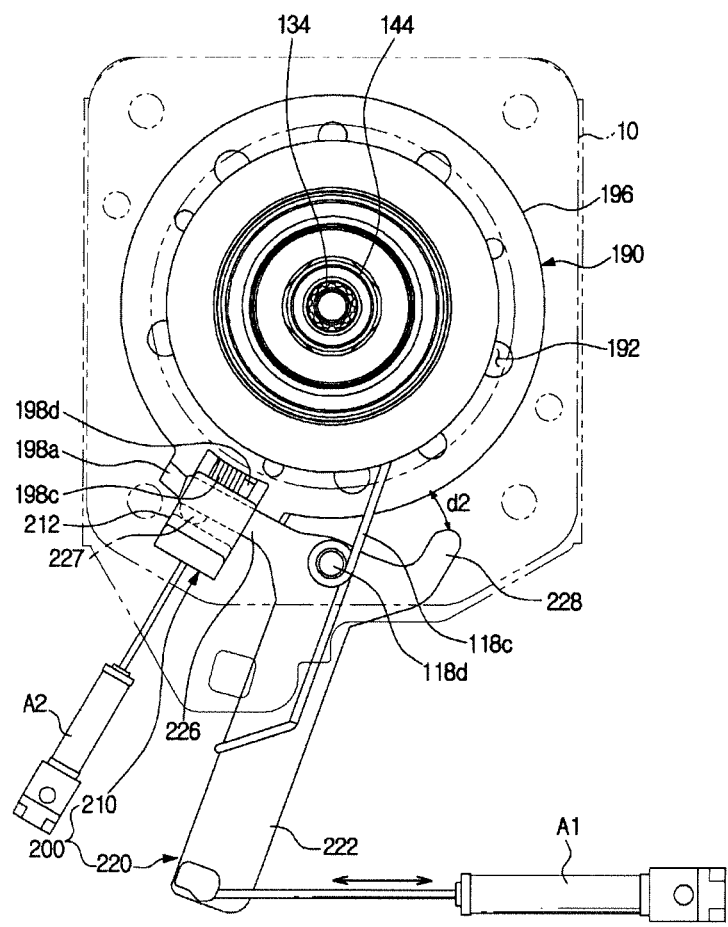

[Fig. 21]
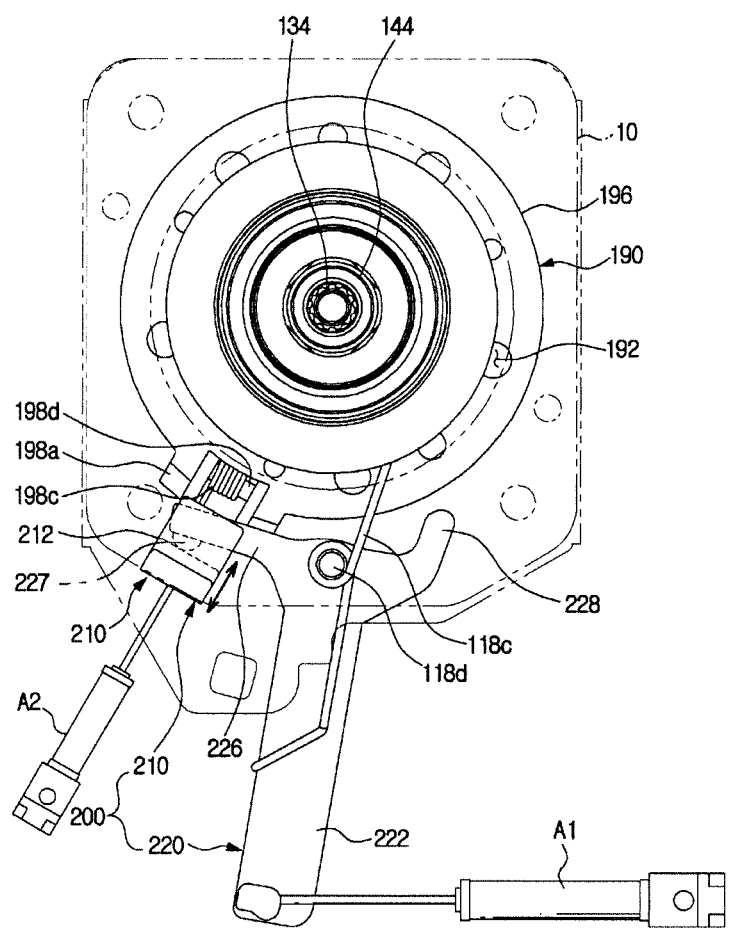

CLUTCH ASSEMBLY OF WASHING MACHINE

This application is a U.S. National Stage Application, which claims the benefit under 35 U.S.C. § 371 of International Patent Application No. PCT/KR2017/000213 filed on Jan. 6, 2017, which claims the foreign priority benefit under 35 U.S.C. § 119 of Korean Patent Application No. 10-2016-0001475, filed Jan. 6, 2016 and Korean Patent Application No. 10-2016-0110322, filed Aug. 29, 2016, the contents of which are incorporated herein by reference.

TECHNICAL FIELD

The present invention relates to a washing machine, and more particularly, to a washing machine that improves the structure of a clutch assembly that transmits power of a motor.

BACKGROUND ART

A washing machine is a machine for washing clothing using electric power. The washing machine generally includes a tub for storing wash water, a drum rotatably installed in a water tank, a pulsator rotatably installed on the bottom of the drum, a motor for rotationally driving the pulsator, and a clutch assembly for transmitting the power of the motor to the drum and the pulsator.

In the washing machine, during the washing cycle, the pulsator rotates while laundry and water are contained in the drum, and contaminants are separated from the laundry by a water stream formed in the drum, and during the rinse cycle, the drum and the pulsator rotate together so that the separated contaminants are dissolved in the water.

Therefore, the conventional washing machine is equipped with a clutch assembly that converts a mode for transmitting the power of the motor to the pulsator to a mode for transmitting the power of the motor to both the pulsator and the drum. In other words, the clutch assembly mounted in the conventional washing machine does not have a mechanism for transmitting the power of the motor only to the drum.

However, in the process of washing the drum by rotating only the pulsator while the drum is stopped, the laundry is often twisted. Depending on the type of laundry, it may be effective to rotate only the rotating drum while the pulsator is stopped.

DISCLOSURE

Technical Problem

Therefore, it is an aspect of the present invention to provide a washing machine capable of transmitting the power of a motor to only a drum.

It is another aspect of the present invention to provide a washing machine capable of alternating the direction of the water flow inside the drum without changing the rotating direction of the motor.

Technical Solution

In accordance with one aspect of the disclosure, a washing machine includes a tub for storing water, a drum rotatably disposed in the tub, a pulsator provided within the drum, the pulsator being rotatable independently of the drum, a motor for generating power and a clutch assembly for transmitting the power of the motor to the drum or the pulsator. The clutch assembly includes a pulsator driving portion coupled to the pulsator to transmit the power of the motor to the pulsator and a coupling selectively coupled to the pulsator driving portion such that the power of the motor is not transmitted to the pulsator.

The clutch assembly transfers the power of the motor to the drum or the pulsator by raising or lowering the coupling.

The washing machine further includes a drum driving portion coupled to the drum to transmit the power of the motor to the drum. The driving direction of the drum is opposite to the rotating direction of the motor when the power of the motor is transmitted to the drum driving portion and the power of the motor is not transmitted to the pulsator driving portion.

The washing machine further includes a sun gear for receiving the power of the motor; and a plurality of planetary gears disposed around the sun gear to engage the sun gear. The pulsator driving portion includes a planetary gear connecting portion connecting a plurality of planetary gear shafts passing through a rotation center of each of the plurality of planetary gears.

The washing machine further comprises a drum driving portion coupled to the drum to transmit the power of the motor to the drum. The drum driving portion includes a ring gear surrounding the plurality of planetary gears and engaging the plurality of planetary gears.

The coupling restrains the rotation of the planetary gear connecting portion so that the plurality of planetary gears do not revolve about the sun gear so that the power is not transmitted to the pulsator.

In accordance with one aspect of the disclosure, a washing machine includes a tub for storing water, a drum rotatably disposed in the tub, a pulsator provided within the drum, the pulsator being rotatable independently of the drum, a motor for generating power and, a clutch assembly for transmitting the power of the motor to the drum or the pulsator. The clutch assembly includes a driving shaft receiving the power from the motor, a pulsator shaft surrounding the driving shaft and coupled to the pulsator to transmit the power of the motor to the pulsator, pulsator shaft teeth formed on the outer periphery of the pulsator shaft and a coupling engaged with the pulsator shaft teeth to selectively restrict the rotation of the pulsator shaft.

The clutch assembly includes a drum shaft surrounding the pulsator shaft and coupled to the drum to transmit the power of the motor to the drum and drum shaft teeth formed on an outer circumference of the drum shaft.

The coupling includes a pulsator restricting portion engaging the pulsator shaft teeth and a drum coupling portion engaging the drum shaft teeth.

The power of the motor is transmitted to the drum via the coupling when the drum coupling portion is engaged with the drum shaft teeth.

The clutch assembly raises or lowers the coupling such that the coupling selectively engages the pulsator shaft teeth.

The washing machine further includes a sun gear formed at one end of the driving shaft, a plurality of planetary gears disposed around the sun gear and engaging the sun gear and a ring gear surrounding the plurality of planetary gears and meshing with the plurality of planetary gears. When the coupling is engaged with the pulsator shaft teeth and the rotation of the pulsator shaft is restricted, the plurality of planetary gears cannot revolve around the sun gear and the ring gear rotates.

In accordance with one aspect of the disclosure, a washing machine includes a tub for storing water, a drum rotatably disposed in the tub, a pulsator provided within the drum, the pulsator being rotatable independently of the drum, a pulsator driving portion coupled to the pulsator for delivering power to the pulsator, a motor for generating power, a sun gear for receiving the power from the motor, a plurality of planetary gears disposed around the sun gear and engaging the sun gear and a ring gear surrounding the plurality of planetary gears and configured to engage with the plurality of planetary gears. The pulsator driving portion rotates as the plurality of planetary gears rotate about the sun gear along the ring gear.

The washing machine further comprises a coupling for selectively restricting the rotation of the pulsator driving portion to prevent revolution of the plurality of planetary gears.

The washing machine may further include a drum driving portion coupled to the drum to transmit the power to the drum. The drum driving portion is engaged with the ring gear to rotate integrally.

The coupling selectively restrains the rotation of the pulsator driving portion by raising or lowering the coupling.

Advantageous Effects

According to an aspect of the invention, the operating mode of the washing machine can be varied by an improved clutch assembly. Particularly, when the washing machine is operated by appropriately combining a pulsator rotation mode, drum rotation mode, and pulsator and drum simultaneous rotation mode during washing or rinsing, there is an advantage in that the washing power is improved and water consumption is reduced.

DESCRIPTION OF DRAWINGS

FIG. 1 is a cross-sectional view of a washing machine according to an embodiment of the present invention.

FIG. 3 is an exploded perspective view of a clutch assembly according to an embodiment of the present invention.

FIG. 4 is an exploded perspective view of a drum driving portion and a pulsator driving portion according to an embodiment of the present invention.

FIG. 5 is an enlarged view of a lower drum shaft and a lower pulsator shaft according to an embodiment of the present invention.

FIG. 6 is a cross-sectional view of a clutch assembly according to an embodiment of the present invention.

FIG. 7 is a front view of a planetary gear assembly according to an embodiment of the present invention.

FIG. 8 is a top perspective view of a coupling according to an embodiment of the present invention.

FIG. 9 is a bottom perspective view of a coupling according to an embodiment of the present invention.

FIG. 10 is a cross-sectional view of a coupling according to an embodiment of the present invention.

FIG. 11 is a perspective view of a lever according to an embodiment of the present invention.

FIG. 12 is a perspective view of a trigger according to an embodiment of the present invention.

FIGS. 13 and 14 are views of operating positions of a coupling in a first mode of a clutch assembly according to an embodiment of the present invention.

FIGS. 15 and 16 are views of operating positions of a coupling in a second mode of a clutch assembly according to an embodiment of the present invention.

FIGS. 17 and 18 are diagrams illustrating operating positions of a coupling in a third mode of a clutch assembly according to an embodiment of the present invention.

FIGS. 19 and 21 are diagrams illustrating the operation of a clutch assembly according to another embodiment of the present invention.

BEST MODE

Figure 2A:
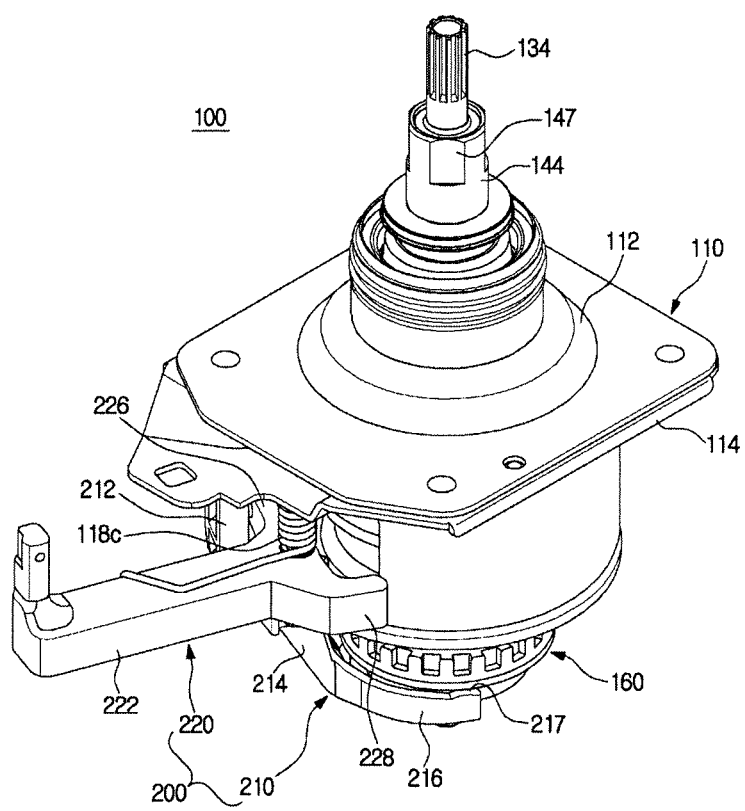
FIG. 2A is a perspective view of a clutch assembly according to an embodiment of the present invention.

Embodiments described in this specification and configurations illustrated in the drawings are only exemplary examples of the disclosed invention, and the invention covers various modifications that can substitute the embodiments herein and drawings at the time of filing of this application.

In addition, the same reference number refers to a part or component substantially performing the same function.

In addition, the terms used in the present specification are merely used to describe embodiments and are not intended to limit and/or restrict embodiments. An expression used in the singular form encompasses the expression in the plural referent unless it has a clearly different meaning in the context. In the present specification, terms such as "including," "having," and "comprising" are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

In addition, although the terms "first," "second," etc. may be used herein to describe various elements, these elements should not be limited by these terms. These terms are only used to distinguish one element from another. For example, a first element could be termed a second element, and, similarly, a second element could be termed a first element without departing from the scope of the present invention. As used herein, the term "and/or" includes any and all combinations of one or more of the associated listed items.

Hereinafter, embodiments according to the present invention will be described in detail with reference to the accompanying drawings.

FIG. 1 is a cross-sectional view of a washing machine according to an embodiment of the present invention.

As shown in FIG. 1, a washing machine 1 includes a cabinet 20 for forming an outer appearance, a tub 30 disposed inside the cabinet 20 for storing wash water, a drum 40 disposed rotatably, and a pulsator 45 disposed inside the drum 40 to generate a water stream.

An inlet 22 is formed in the upper part of the cabinet 20 to allow laundry to be introduced into the drum 40. The inlet 22 is opened and closed by a door 21 installed on the upper part of the cabinet 20.

The tub 30 is supported by the cabinet 20 by a suspension device 31 connecting the lower outer side of the tub 30 and the upper side of the cabinet 20. The vibration generated in the tub 30 during washing or dehydrating by the suspension device 31 is prevented from being transmitted to the cabinet 20.

A water supply pipe 51 for supplying washing water to the tub 30 is installed at an upper portion of the tub 30. One side of the water supply pipe 51 is connected to an external water source (not shown), and the other side of the water supply pipe 51 is connected to a detergent supply pipe 50. Water supplied through the water supply pipe 51 is supplied to the inside of the tub 30 together with the detergent via the detergent supply pipe 50. A water supply valve 52 is installed in the water supply pipe 51 to control the supply of water.

A plurality of dehydration holes 41 are provided on the side of the drum 40 to communicate with the inner space of the drum 40 and the inner space of the tub 30.

A balancer 42 can be mounted on the upper portion of the drum 40 so that an unbalanced load generated in the drum 40 during the high speed rotation of the drum 40 is offset and the drum 40 can be stably rotated.

The pulsator 45 is rotated forward or reverse to generate a water flow, and the laundry in the drum 40 is stirred together with the washing water by the water flow.

A drainage hole 60 is formed at the bottom of the tub 30 to discharge the washing water stored in the tub 30 and a first drain pipe 61 is connected to the drainage hole 60. The first drain pipe 61 is provided with a drain valve 62 for interrupting drainage.

The outlet of the drain valve 62 is connected to a second drain pipe 63 for discharging the wash water to the outside. The drain valve 62 may be provided in various configurations such as a solenoid device or a link device connected to an electric motor.

A motor 70 for generating a driving force by receiving power is disposed at a lower end of the tub 30. The motor 70 consists of a circular stator 71 and a rotor 72 disposed on the outer periphery of the stator 71. A shaft hole 75 is formed at the center of the rotor 72 so that a shaft or a clutch boss 180 engaged with a serration 77 formed on the inner circumferential surface of the shaft hole 75 is rotated. A clutch assembly 100 is disposed between the motor 70 and the tub 30 to selectively transmit the driving force of the motor 70 to the drum 40 and the pulsator 45.

Particularly, in this embodiment, a direct coupling structure in which the motor 70 and the clutch assembly 100 are vertically arranged in a line is shown.

Figure 2B:
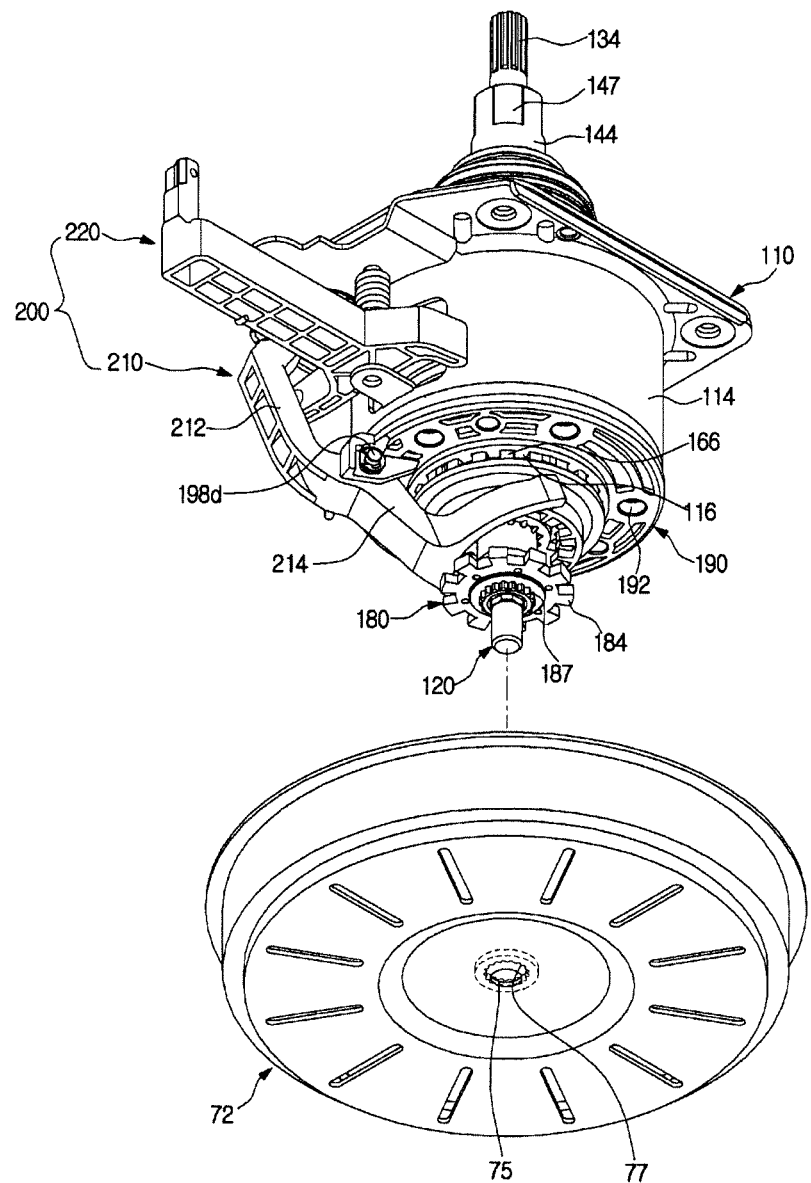
FIG. 2B is a bottom perspective view of a clutch assembly and a rotor according to an embodiment of the present invention.

FIG. 2A is a perspective view of a clutch assembly according to an embodiment of the present invention, FIG. 2B is a bottom perspective view of a clutch assembly and a rotor according to an embodiment of the present invention, and FIG. 3 is a perspective view of a clutch assembly according to an embodiment of the present invention.

The clutch assembly 100 receives power from the motor 70 and is adapted to selectively transmit a driving force to at least one of the pulsator 45 and the drum 40. The clutch assembly 100 includes a housing 110 that is configured to protect its internal configuration. The housing 110 is divided into an upper housing 112 and a lower housing 114. A portion of a driving shaft 120 protrudes below the lower housing 114 and a portion of a drum driving portion 140 and a portion of a pulsator drive portion 130 protrude above the upper housing 112.

The clutch assembly 100 includes the driving shaft 120, the pulsator drive portion 130, the drum driving portion 140, and the clutch boss 180.

The clutch boss 180 may include a boss hole 183 formed in the center portion, a circular hub 182 surrounding the boss hole 183 and boss teeth 184 formed along the periphery of the hub 182. The clutch boss 180 is a component to which the driving force of the motor 70 is primarily transmitted and a boss gear 187 corresponding to the serration 77 provided on the inner circumferential surface of the shaft hole 75 of the rotor 72 is formed on the outer periphery of the hub 182 protruding downward. That is, the clutch boss 180 is always rotated integrally with the motor 70. The boss hole 183 is formed to have a polygonal cross-section, and functions to transmit power to the driving shaft 120 coupled to the boss hole 183. The detailed configuration of the clutch boss 180 will be described later.

The driving shaft 120 is connected to the clutch boss 180 so that the power generated by the motor 70 is transmitted to the pulsator drive portion 130 or the drum driving portion 140. The driving shaft 120 is a rod shaft and includes a boss engaging portion 126 at one end for engaging the clutch boss 180 and a serration type gear at the other end that functions as a sun gear 122 of a planetary gear assembly 150. The boss engaging portion 126 has a polygonal cross-section corresponding to the boss hole 183 and is fitted in the boss hole 183. Thus, the driving shaft 120 is always rotated integrally with the motor 70.

The pulsator drive portion 130 may be conveniently divided into a lower pulsator shaft 132 and an upper pulsator shaft 134. The lower pulsator shaft 132 and the upper pulsator shaft 134 do not operate independently but rotate integrally. The lower pulsator shaft 132 is a cylindrical shaft whose center is hollow and the driving shaft 120 can be inserted into the hollow portion of the lower pulsator shaft 132. Pulsator shaft teeth 133 may be provided on the lower circumference of the lower pulsator shaft 132. The pulsator shaft teeth 133 are serration-shaped in such a manner that a plurality of projections are spaced apart along the outer circumferential surface of the lower pulsator shaft 132 and are selectively engaged with a pulsator shaft restricting portion 164 of a coupling 160 to be described later.

An upper portion of the lower pulsator shaft 132 is provided with a lower planetary gear connecting portion 136 on which a plurality of planetary gears 152 are mounted and the lower planetary gear connecting portion 136 engages with an upper planetary gear connecting portion 135 disposed thereabout with the planetary gears 152 therebetween. The upper pulsator shaft 134 is coupled to the center of the upper planetary gear connecting portion 135 and the pulsator 45 is coupled to one end of the upper pulsator shaft 134 to rotate the pulsator 45.

The drum driving portion 140 can be divided into a lower drum shaft 142 and an upper drum shaft 144 for convenience. The lower drum shaft 142 and the upper drum shaft 144 do not operate independently but rotate integrally. The lower drum shaft 142 is a cylindrical shaft whose center is hollow and the lower pulsator shaft 132 can be inserted into the hollow portion of the lower drum shaft 142. Accordingly, the lower pulsator shaft 132 surrounds the driving shaft 120 located at the center, and the lower drum shaft 142 encloses the lower pulsator shaft 132.

Drum shaft teeth 143 may be provided on the outer periphery of the lower end of the lower drum shaft 142. The drum shaft teeth 143 are of a serration type in which a plurality of protrusions are spaced apart along the outer peripheral surface of the lower drum shaft 142. As shown in FIG. 5, the drum shaft teeth 143 are located above the pulsator shaft teeth 133. The drum shaft teeth 143 can be selectively engaged with a drum shaft coupling portion 168 of the coupling 160 described below. When the lower drum shaft 142 is engaged with the coupling 160, the power of the motor is transmitted to the drum driving portion 140 through the coupling 160.

A gearbox base 146b in the form of a flange is provided at the upper end of the lower drum shaft 142 so that the upper surface of the gearbox base 146b faces the lower surface of the lower planetary gear connecting portion 136. A lubricant such as grease is applied between the upper surface of the gearbox base 146b and the lower surface of the lower planetary gear connecting portion 136 to enable the relative rotation of the lower drum shaft 142 with respect to the lower pulsator shaft 132.

The upper drum shaft 144 includes a gearbox 146 that is coupled onto the gearbox base 146b of the lower drum shaft 142. A drum coupling portion 147 is provided on the side of the upper drum shaft 144 opposite to the gearbox 146 and coupled to the drum 40 so that the power of the motor 70 is transmitted to the drum 40.

The upper drum shaft 144 is a cylindrical shaft whose center is hollow, and the upper pulsator shaft 134 can be inserted into the hollow portion of the upper drum shaft 144. Since the upper drum shaft 144 and the upper pulsator shaft 134 are spaced apart from each other so as not to contact each other, they can rotate independently of each other. The upper pulsator shaft 134 protrudes higher than the drum coupling portion 147 of the upper drum shaft 144 and is coupled to the pulsator 45.

FIG. 7 is a front view of a planetary gear assembly according to an embodiment of the present invention.

Referring to FIGS. 6 and 7, the planetary gear assembly 150 is connected to the driving shaft 120, the drum driving portion 140, and the pulsator drive portion 130 and the driving force is transmitted from the driving shaft 120 to the driving portion of at least one of the drum driving portion 140 and the pulsator drive portion 130.

The planetary gear assembly 150 is disposed within the gearbox 146 that constitutes part of the drum driving portion 140. The gearbox 146 includes a cylindrical gearbox body 146a having a larger diameter than the upper drum shaft 144 below the upper drum shaft 144 and a gearbox base 146b formed in the form of a flange on the lower drum shaft 142.

The planetary gear assembly 150 may include the sun gear 122, the plurality of planetary gears 152, and a ring gear 154. The rotation of the sun gear 122 causes the planetary gears 152 engaged with the sun gear 122 to rotate or revolve and the ring gear 154 is rotated about the same axis as a rotation axis X of the sun gear 122 by the rotation of the planetary gears 152. Here, the rotation of the planetary gears 152 means that each planetary gear rotates around each rotation axis (x1, x2, x3, x4) and the rotation of the planetary gears 152 means that the rotation axes (x1, x2, x3, x4) of each planetary gear rotate around the rotation axis X of the sun gear. The revolution of the planetary gears 152 involves the rotation of the planetary gears 152. That is, when the rotation of the ring gear 154 is constrained, the planetary gears 152 are engaged with the ring gear 154 to rotate about the sun gear 122 by the rotation of the planetary gears 152. On the other hand, when the revolution of the planetary gears 152 is constrained, the ring gear 154 is rotated by the rotation of the planetary gears 152.

The sun gear 122 may be provided at one end of the driving shaft 120. That is, the driving shaft 120 may include the sun gear 122 provided in a serration form on the outer circumferential surface opposite to the side coupled with the clutch boss 180. The driving force of the motor can be transmitted to the plurality of planetary gears 152 and the ring gear 154 through the sun gear 122 of the driving shaft 120.

The plurality of planetary gears 152 may be coupled to the pulsator drive portion 130. In other words, as the planetary gears 152 revolve about the sun gear 122, the rotational force is transmitted to the upper pulsator shaft 134.

The pulsator drive portion 130 may include the pair of planetary gear connecting portions 135 and 136 connecting a plurality of planetary gear shafts 152a that are the rotational centers of each of the plurality of planetary gears 152. The pair of planetary gear connecting portions 135 and 136 rotatably support one end and the other end of the plurality of planetary gear shafts 152a so that the planetary gears 152 rotate about the rotation axis X when they revolve. The planetary gear connecting portions 135 and 136 may be composed of the upper planetary gear connecting portion 135 and the lower planetary gear connecting portion 136.

The center of the upper planetary gear connecting portion 135 is connected to the upper pulsator shaft 134 and the center of the lower planetary gear connecting portion 136 is connected to the lower pulsator shaft 132. In this embodiment, the upper planetary gear connecting portion 135 is formed integrally with the upper pulsator shaft 134, and the lower planetary gear connecting portion 136 is formed integrally with the lower pulsator shaft 132.

The ring gear 154 may be connected to the drum driving portion 140. The ring gear 154 surrounds the plurality of planetary gears 152 and has the same rotational axis as the sun gear 122. That is, the serration formed inside the ring gear 154 is provided to rotate in engagement with the serration formed on the outer periphery of the planetary gears 152. The outer circumferential surface of the ring gear 154 is closely fixed to the inner circumferential surface of the gearbox body 146a so that the ring gear 154 and the gearbox body 146a are integrally rotated. The driving force transmitted to the ring gear 154 can be transmitted to the drum driving portion 140 through this configuration. The ring gear 154 and the gearbox body 146a of the drum driving portion 140 may be integrally formed.

FIG. 8 is a top perspective view of a coupling according to an embodiment of the present invention, FIG. 9 is a bottom perspective view of a coupling according to an embodiment of the present invention, and FIG. 10 is a sectional view of a coupling according to an embodiment of the present invention.

The clutch assembly 100 can be rotated in a first, second or third mode by restricting the rotation of the lower pulsator shaft 132 or transmitting power to the lower drum shaft 142 depending on the position of the coupling 160.

As described above, the driving shaft 120, the lower drum shaft 142, and the lower pulsator shaft 132 have the same rotation axis X and by changing the position of the coupling 160 in the direction of the rotation axis X, a rotational force can be transmitted to the lower drum shaft 142 or the rotation of the lower pulsator shaft 132 can be restrained.

The coupling 160 may include a cylindrical coupling body 162 having a hollow portion. The driving shaft 120, the lower pulsator shaft 132, and the lower drum shaft 142 may pass through the hollow portion of the coupling body 162.

The coupling body 162 can be divided into an upper body 162a and a lower body 162b. The drum shaft coupling portion 168 is provided on the inner peripheral surface of the upper body 162a and the pulsator shaft restricting portion 164 and a coupling gear 170 are provided on the inner side of the lower body 162b. As described above, according to the embodiment of the present invention, since the lower drum shaft 142 surrounds the outer periphery of the lower pulsator shaft 132, the diameter of the lower drum shaft 142 is bigger than the diameter of the lower pulsator shaft 132. The inner diameter of the drum shaft coupling portion 168 corresponding to the lower drum shaft 142 should be formed larger than the inner diameter of the pulsator shaft restricting portion 164 corresponding to the lower pulsator shaft 132.

To this end, the lower body 162b is provided with an extension 163 protruding radially inwardly along the inner periphery of the hollow portion of the coupling body 162 and the pulsator shaft restricting portion 164 comprises a serration formed along the inner periphery of the extension portion 163.

The coupling 160 may include coupling teeth 166 formed at an intermediate position between the upper body 162a and the lower body 162b. The coupling teeth 166 protrude from the outer periphery of the coupling body 162 and are disposed to surround the coupling body 162. The coupling teeth 166 include a plurality of coupling protrusions 167a protruding radially outward along the outer periphery and a plurality of coupling grooves 167b disposed between the coupling protrusions 167a.

Next, a lever unit for vertically moving the coupling 160 will be described with reference to FIGS. 3 and 11 to 13.

The clutch assembly 100 according to the embodiment of the present invention operates a lever unit 200 to determine the position of the coupling 160. The lever unit 200 includes a lever 210 and a trigger 220.

The lever 210 is composed of an upper lever 212 and a lower lever 214 and is bent on the basis of a lever pivot hole 215 formed between the upper lever 212 and the lower lever 214. The ends of the lower lever 214 are branched to form a pair of C-shaped guide arms 216 and each of the guide arms 216 may include a coupling supporting portion 217 that abuts the coupling 160 to support the coupling 160. The upper lever 212 is a portion that receives the force from the trigger 220 in contact with the trigger 220 and the lever 210 can pivot about the lever pivot hole 215 by the force applied to the upper lever 212.

The trigger 220 includes a trigger bar 222 forming a body and a connecting arm 226 and a stopper 228 branched at one end of the trigger bar 222 and has a substantially T shape. The trigger 220 may also include a trigger pivot hole 225 formed at a midpoint between the trigger bar 222 and the connecting arm 226 and the stopper 228. The trigger pivot hole 225 is disposed between a pair of trigger supports 118a formed on one side of the housing 110. A trigger support hole 118b is formed in each of the pair of trigger supports 118a and the trigger 220 is pivotally mounted on the housing 110 by the pair of trigger support holes 118b and a trigger pivot pin 118d passing through the trigger pivot hole 225. An elastic member 118c may be disposed between the trigger 220 and the trigger support 118a so that the trigger 220 is biased in a direction to press the lever 210 or vice versa.

Referring to FIG. 3, the clutch assembly 100 according to the embodiment of the present invention may include a lever holder 190 coupled to the lower surface of the housing 110. The lever holder 190 includes an annular holder body 196, a housing coupling 192 for coupling the holder body 196 to the housing 110 and a pair of lever supporting portions 198a protruding from one side of the holder body 196. The lever holder 190 may be fixed to the lower surface of the housing 110 by a plurality of fastening members (not shown) and may alternatively be formed integrally with the housing 110. Further, the lever supporting portion holes 198b are formed in the pair of lever supporting portions 198a, respectively and the lever 210 is pivotally mounted on the lever holder 190 by a lever pivot pin 198d passing through a pair of lever supporting portion holes 198b and a lever pivot hole 215. An elastic member 198c may be disposed between the lever 210 and the lever holder 190 such that the guide arm 216 of the lever 210 is biased downward.

Referring to FIG. 13, with such a configuration, when the trigger 220 is operated by an actuator (not shown), the trigger 220 is pivotally rotated counterclockwise around the trigger pivot hole 225 and the lever contact portion 227 of the connecting arm 226 presses the upper lever 212 and the lever 210 pivots about the lever pivotal hole 215 so that the guide arm 212 of the lever 210 is raising the coupling 160. In the embodiment of the present invention, the operating modes of the clutch assembly are determined to be the first, second, and third modes depending on the position of the coupling 160 in the upper, middle, and lower positions.

Although the lever 210 and the trigger 220 are used as a mechanism for changing the position of the coupling 160 in this embodiment, the coupling 160 may be configured to reciprocate using a cam, a gear, or the like.

A coupling stopper 191 is disposed adjacent to the hollow portion of the lever holder 190 and includes a plurality of protrusions 191a protruding downward from the lower surface of the holder body 196. The coupling stopper 191 has a shape corresponding to the coupling teeth 166 so that the coupling stopper 191 is engaged with the coupling teeth 166 at a position where the coupling 160 is raised.

Referring to FIG. 3, the clutch boss 180 may include the boss hole 183 formed in the center portion, the circular hub 182 surrounding the boss hole 183 and the boss teeth 184 formed along the periphery of the hub 182. The boss teeth 184 include a plurality of boss protrusions 184 protruding radially from the outer periphery of the hub and a plurality of boss grooves 185 formed in a groove shape between the boss protrusions 184. Accordingly, the boss teeth 184 and the coupling gear 170 are engaged with each other at a position where the coupling 160 is lowered, and the power of the motor is transmitted to the coupling 160 so that the coupling 160 can rotate.

Hereinafter, the operation principle of the clutch assembly 100 according to the embodiment of the present invention will be described.

First, a first mode M1 is a drum rotation mode in which the driving force of the motor is transmitted to the drum only and the pulsator is not rotated.

Referring to FIGS. 13 and 14, the trigger 220 which receives a force in the direction of an arrow F1 from an actuator (not shown) rotates counterclockwise about the trigger pivot hole 225, the lever contact portion 227 of the trigger 220 presses the upper lever 212, the lever 210 is pivotally rotated about the lever pivot hole 215, and the upper lever 212 of the lever moves away from the housing 110 side and the guide arm 216 of the lower lever 214 lifts the coupling 160. When the coupling 160 is in the up position, the coupling teeth 166 of the coupling 160 are engaged with the coupling stopper 191 of the lever holder 190 to restrain the rotation of the coupling 160 and the pulsator shaft restricting portion 164 of the coupling 160 is engaged with the pulsator shaft teeth 133 to restrain the lower pulsator shaft 132. When the rotation of the lower pulsator shaft 132 is restrained, the rotation of the planetary gears 152 disposed at the upper portion of the lower pulsator shaft 132 is free to rotate, but the revolution of the planetary gears 152 is restrained. That is, the planetary gear shafts 152a cannot rotate about the sun gear 122. On the other hand, the drum shaft teeth 143 of the lower drum shaft 142 are formed between the drum shaft coupling portion 168 of the coupling 160 and the pulsator shaft restricting portion 164 and disposed at flat portions 174 on which no serration is formed and the lower drum shaft 142 is free to rotate without engaging with the coupling 160.

Thus, in this state, the power from the driving shaft 120 is transmitted to the ring gear 154 through the rotation of the sun gear 122 and the planetary gears 152. This operation causes the drum driving portion 140 connected to the ring gear 154 to rotate. This power transmission path follows an arrow T1 shown in FIG. 14. That is, the power of the motor 70 rotates the drum 40 through the clutch boss 180, the driving shaft 120, the planetary gear 152, the ring gear 154, the gearbox 146 and the upper drum shaft 144. At this time, the rotational direction of the motor 70 and the rotational direction of the drum 40 are opposite to each other, and the rotational speed of the motor 70 versus the rotational speed of the drum 40 is approximately 4:1 to 5:1 and the ratio of the rotational speed of the motor 70 to the rotational speed of the drum 40 varies depending on the number of gear teeth of the sun gear 122, the number of gear teeth of the planetary gear 152, and the number of gear teeth of the ring gear 154.

The washing machine according to the present invention can operate in a first mode during a washing or rinsing cycle and operate in the first mode in some process during the wash cycle or in some process during the rinse cycle. In the conventional washing machine, during the washing cycle, the pulsator rotated only with the rotating drum stopped, or the rotating drum and pulsator rotated together, however, the washing machine according to the present invention has an advantage that the damage of the laundry can be reduced by having the process of rotating the rotating drum only while the pulsator is stopped during the washing cycle. Further, in the washing, rinsing and dewatering cycles, which are all the cycles of the washing machine, the rinsing cycle is usually repeated two or more times and at the time of the first rinsing cycle or the last rinsing cycle, the washing machine is programmed to operate in the first mode, thereby saving washing water.

Next, the power transmission path of the motor will be described when the washing machine according to the present invention operates in a pulsator rotation mode of a second mode M2.

FIGS. 15 and 16 are diagrams illustrating the operation of the clutch assembly in the second mode according to an embodiment of the present invention.

The trigger 220 which receives the force in the direction of an arrow F2 from the actuator rotates counterclockwise about the trigger pivot hole 225 as in the first mode M1, and the angle by which the actuator rotates the trigger 220 in the second mode M2 is smaller than in the case of the first mode. That is, when the rotation angle of the trigger 220 is substantially maximum in the first mode M1 and the stopper 228 of the trigger 220 is in contact with the side surface of the housing 110 as shown in FIG. 13 The stopper 228 of the trigger 220 maintains the distance d1 from the housing 110 in the second mode M2. In other words, the position of the trigger 220 in the second mode M2 is approximately halfway between the position of the trigger 220 in the first mode M1 and the position of the trigger 220 in a third mode M3 described below. However, in some cases, if the second mode M2 is set to a neutral position, the actuator may operate only in the first mode M1 and the third mode M3, and the actuator may not operate in the second mode M2.

When the upper lever 212 is applied with a force by the rotation of the trigger 220, the lever 210 pivots about the lever pivot hole 215 as described above and the coupling 160 is raised by the guide arm 216 of the lower lever 214. When the position of the coupling 160 in the first mode M1 is referred to as an upper position, the position of the coupling 160 in the second mode M2 may be referred to as a middle position. That is, in the second mode M2, the coupling 160 is lower than the position of the coupling 160 in the first mode M1. When the coupling teeth 166 of the coupling 160 are located below the coupling stopper 191 without engaging the coupling stopper 191 of the lever holder 190, the pulsator shaft teeth 133 of the lower pulsator shaft 132 are also located above the pulsator shaft restricting portion 164 without engaging the pulsator shaft restricting portion 164 of the coupling 160, and the drum shaft teeth 143 of the lower drum shaft 142 are also located below the drum shaft coupling portion 168 without engaging the drum shaft coupling portion 168 of the coupling 160. That is, the pulsator shaft teeth 133 and the drum shaft teeth 143 are positioned at the flat portion 174 between the pulsator shaft restricting portion 164 of the coupling 160 and the drum shaft coupling portion 168. Consequently, in the second mode M2, the coupling 160 does not engage the lever holder 190, the pulsator shaft teeth 133, or the drum shaft teeth 143.

In this state, the power from the driving shaft 120 is transmitted to the plurality of planetary gears 152 via the sun gear 122. The power by the rotation of the planetary gear 152 is transmitted to the ring gear 154. However, since the drum 40 has a relatively larger mass than the pulsator 45, the moment of inertia for rotating the drum 40 in the stopped state is much larger than the moment of inertia for rotating the pulsator 45 in the stopped state. Thus, the rotation of the planetary gears 152 causes the planetary gears 152 themselves to revolve along the ring gear 154, instead of rotating the ring gear 154. The revolutions of these planetary gears 152 cause the pulsator drive portion 130 and the pulsator 45 to rotate through the planetary gear connecting portions 135 and 136.

Alternatively, a braking device (not shown) may be mounted in contact with the side of the gearbox 146 to more reliably restrain the rotation of the drum driving portion 140. In this case, the brake device may be operated to restrain the drum driving portion 140 in the second mode M2 and to release the constraint of the drum driving portion 140 in the first mode M1 and the third mode M3.

In the second mode M2 according to an embodiment of the present invention, the power of the motor 70 rotates the pulsator 45 by being transmitted to the pulsator driving portion 130 through the rotation of the sun gear 122 of the driving shaft 120 and revolution of the planetary gears 152. The power transmission path at this time follows an arrow T2 shown in FIG. 16. At this time, the rotational direction of the motor 70 is the same as the rotational direction of the pulsator 45, but the rotational speed of the pulsator 45 is reduced with respect to the rotational speed of the motor at a rotational speed of 4:1 to 5:1. The deceleration rate may vary depending on the number of gear teeth of the sun gear 122, the planetary gear 152, or the ring gear 154.

The washing machine according to the present invention can operate in the second mode during a washing or rinsing cycle and can operate in the second mode for a part of the washing cycle. As described above, in the first mode, the rotation direction of the drum is opposite to the rotation direction of the motor, and in the second mode, the rotation direction of the pulsator is the same as the rotation direction of the motor. Therefore, when the first mode and the second mode are alternately operated in the washing cycle, the rotating direction of the water flow and laundry is naturally alternated. That is, conventionally, in the washing cycle, the rotation direction of the motor is changed to change the water flow. However, in the washing machine equipped with the clutch assembly 100 according to the present invention, the washing operation can be performed while changing the rotating direction of the water flow through the conversion of the first mode and the second mode without changing the rotating direction of the motor.

FIGS. 17 and 18 are diagrams illustrating the operation of the clutch assembly in the third mode according to an embodiment of the present invention.

Unlike the first mode M1 and the second mode M2, the actuator does not operate in the third mode M3. That is, the actuator does not exert any force on the trigger 220, the trigger 220 maintains the original state without pivoting, and the stopper 228 of the trigger 220 is spaced apart from the housing 110 by a distance d2 that is greater than the distance d1. Further, since the trigger 220 does not press the upper lever 212, by the elastic force of the elastic member 198c coupled to the lever pivot hole 215, the upper lever 212 is upright so as to be substantially horizontal with the rotation axis X of the motor and the guide arm 216 of the lower lever 214 does not press the coupling 160.

Thus, the coupling 160 can be located at the lowest position by gravity, and the coupling 160 is biased to engage with the clutch boss 180 by the elastic force of the spring 176 disposed between the lever holder 190 and the coupling 160. When the coupling 160 is at its lowest position, the coupling gear 170 of the coupling 160 is engaged with the boss teeth 184 of the clutch boss 180 and the position of the coupling 160 at this time is referred to as a lower position. When the coupling 160 is in the down position, the drum shaft coupling portion 168 of the coupling 160 engages the drum shaft teeth 143. On the other hand, since the pulsator shaft teeth 133 are located on the flat portion 174 of the coupling 160, they do not engage with the coupling 160. The power of the motor 40 in the third mode M3 is transmitted not only to the driving shaft 120 but also to the coupling 160 coupled with the clutch boss 180. Also, the drum driving portion 140 is rotated by the drum shaft teeth 143 engaged with the drum shaft coupling portion 168 of the coupling 160. Therefore, since the rotational speed of the driving shaft 120 and the rotational speed of the drum driving portion 140 are the same, no power transmission occurs between the sun gear 122 and the planetary gears 152 of the drive shaft 120 and no power transmission occurs between the planetary gears 152 and the ring gear 154. In other words, the pulsator driving portion 130 and the drum driving portion 140 are rotated as one rigid body. In the third mode M3, the power transmission path follows an arrow T3 shown in FIG. 18, and the rotation speed and rotation direction of the motor 70, the pulsator 45, and the drum 40 are the same.

Basically, the third mode M3 is a mode that operates during the dewatering cycle of the washing machine, which separates the water contained in the laundry by rotating the drum and the pulsator at a high speed. However, in some cases, the washing machine may be operated in the third mode even during the washing or rinsing cycle.

Hereinafter, a washing machine according to another embodiment of the present invention will be described. The description of the constitution overlapping with the above description will be omitted.

Will be described with reference to the FIGS. 19 and 20 and the drawings described above.

The washing machine may operate the drum rotation mode, which is the first mode M1, the pulsator rotation mode, which is the second mode M2, and a dehydration mode, which is the third mode M3.

The first and third modes M1 and M3 may be operated by moving the trigger 220 and the second mode M2 may be operated by moving the lever 210. Referring to FIGS. 19 and 20, the trigger 220 and the lever 210 can be operated by first and second actuators A1 and A2, respectively.

In the first mode M1, the stopper 228 of the trigger 220 is in contact with the side surface of the housing 110 as shown in FIG. 19. At this time, the coupling 160 is moved to the upper position as shown in FIG. 14, and the coupling 160 is engaged with the coupling stopper 191 and the pulsator shaft teeth 133 so that the power is transmitted from the motor 70 to be transferred to the drum 40.

In the third mode M3, the stopper 228 of the trigger 220 is separated from the side surface of the housing 110 by the distance d2 as shown in FIG. 20. The coupling 160 is moved to the lower position as shown in FIG. 18 and the clutch boss 180 and the drum shaft teeth 143 are engaged with each other so that the power is transmitted from the motor 70 to the pulsator 45 and the drum 40.

Since the first mode M1 is the default setting state, when converting from the first mode M1 to the third mode M3, the trigger 220 may be rotated by the first actuator A1 such that the stopper 228 of the trigger 220 is spaced apart from the housing 110 by the distance d2.

On the contrary, if the third mode M3 is the default setting, when converting from the third mode M3 to the first mode M1, the trigger 220 may be rotated by the first actuator A1 such that the stopper 228 of the trigger 220 closely contacts the housing 110.

That is, by the movement of the trigger 220, the washing machine can operate the drum rotation mode and the dehydration mode.

The second mode M2 can be operated by moving the lever 210.

The lever 210 is provided so as to move independently of the trigger 220 by the second actuator A2 as shown in FIG. 21. That is, the second mode M2 can be turned on/off by the second actuator A2.

For example, the second actuator A2 operates the upper lever 212 so that the guide arm 216 of the lower lever 214 moves the coupling 160. The coupling 160 in the second mode M2 may be in the middle position as shown in FIG. 16. At this time, the coupling 160 is not constrained to the pulsator shaft teeth 133 and the drum shaft teeth 143, so that the power is transferred from the motor 70 to the pulsator 45.

By moving the trigger 220 and the lever 210 through the operation of the first and second actuators A1 and A2 as described above, it is possible to clearly distinguish between the modes, thereby preventing malfunction between the modes. Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A washing machine comprising:
   a tub to store water;
   a drum rotatably disposed in the tub;
   a pulsator provided within the drum and being rotatable independently of the drum;
   a motor to generate power; and
   a clutch assembly including:
   a pulsator driving portion coupled to the pulsator to transmit the power generated by the motor to the pulsator,
   a drum driving portion coupled to the drum to transmit the power generated by the motor to the drum, and
   a coupling having a first position and a second position, and being controllable to selectively be in the first position or the second position, wherein,
   in the first position, the coupling is configured with respect to the pulsator driving portion and the drum driving portion so that the power generated by the motor is transmitted to the drum to rotate the drum, with a rotating direction of the drum being opposite to a rotating direction of the motor, and so that the power generated by the motor is not transmitted to the pulsator, and in the second position, the coupling is configured with respect to the pulsator driving portion and the drum driving portion so that the power generated by the motor is transmitted to the pulsator to rotate the pulsator, with a rotating direction of the pulsator being the same as the rotating direction of the motor, and so that the power generated by the motor is not transmitted to the drum.

2. The washing machine according to claim 1, wherein the clutch assembly is configured to raise and lower the coupling to control the coupling to selectively be in the first position or the second position.

3. The washing machine according to claim 1, further comprising:
a driving shaft including a sun gear formed at one end of the driving shaft for receiving the power generated by the motor; and
a plurality of planetary gears disposed around the sun gear to be engaged with the sun gear, and
wherein the pulsator driving portion includes a planetary gear connecting portion connecting a plurality of planetary gear shafts passing through rotation centers of the plurality of planetary gears, respectively.

4. The washing machine according to claim 3,
wherein the drum driving portion includes a ring gear surrounding the plurality of planetary gears and engaged with the plurality of planetary gears.

5. The washing machine according to claim 3, wherein, when the coupling is in the first position, the coupling restrains the rotation of the planetary gear connecting portion to prevent the plurality of planetary gears from revolving about the sun gear, so that the power generated by the motor is not transmitted to the pulsator.

6. The washing machine according to claim 1,
wherein the clutch assembly includes:
a driving shaft receiving the power generated by the motor;
a pulsator shaft surrounding the driving shaft and coupled to the pulsator to transmit the power generated the motor to the pulsator when the coupling is in the second position; and
pulsator shaft teeth formed on the outer periphery of the pulsator shaft; and,
when the coupling is in the first position, the coupling is engaged with the pulsator shaft teeth to restrict the rotation of the pulsator shaft.

7. The washing machine according to claim 6, wherein the clutch assembly includes:
a drum shaft surrounding the pulsator shaft and coupled to the drum to transmit the power generated the motor to the drum when the coupling is in the first position; and
drum shaft teeth formed on an outer circumference of the drum shaft.

8. The washing machine according to claim 7, wherein the coupling includes a pulsator shaft restricting portion engaged with the pulsator shaft teeth and a drum shaft coupling portion engaged with the drum shaft teeth.

9. The washing machine according to claim 8, wherein the power generated by the motor is transmitted to the drum via the coupling when the drum shaft coupling portion is engaged with the drum shaft teeth.

10. The washing machine according to claim 6, wherein the clutch assembly is configured to raise or lower the coupling such that the coupling is selectively engaged with the pulsator shaft teeth.

11. The washing machine according to claim 6, further comprising:
a sun gear formed at one end of the driving shaft;
a plurality of planetary gears disposed around the sun gear and engaged with the sun gear; and
a ring gear surrounding the plurality of planetary gears and engaged with the plurality of planetary gears,
wherein when the coupling is engaged with the pulsator shaft teeth and the rotation of the pulsator shaft is restricted, the plurality of planetary gears is prevented from revolving around the sun gear and the ring gear rotates.

12. The washing machine according to claim 1, further comprising:
a driving shaft including a sun gear to receive the power generated by the motor;
a plurality of planetary gears disposed around the sun gear and engaged with the sun gear; and
a ring gear surrounding the plurality of planetary gears and engaged with the plurality of planetary gears,
wherein the pulsator driving portion rotates as the plurality of planetary gears rotate about the sun gear along the ring gear.

13. The washing machine according to claim 12, wherein the coupling is further adapted to selectively restrict the rotation of the pulsator driving portion to prevent revolution of the plurality of planetary gears.

14. The washing machine according to claim 13,
wherein the drum driving portion is engaged with the ring gear to rotate integrally.

15. The washing machine according to claim 13, wherein the clutch assembly is adapted to selectively restrain the rotation of the pulsator driving portion by raising or lowering the coupling.

16. A washing machine comprising:
a tub to store water;
a drum rotatably disposed in the tub;
a pulsator provided within the drum and being rotatable independently of the drum;
a motor to generate power; and
a clutch assembly including:
a pulsator driving portion coupled to the pulsator to transmit the power generated the motor to the pulsator,
a drum driving portion coupled to the drum to transmit the power generated by the motor to the drum, and
a coupling having a first position, a second position and a third position, and being controllable to selectively be in the first position, the second position or the third position, wherein,
in the first position, the coupling is configured with respect to pulsator driving portion and the drum driving portion so that the power generated by the motor is transmitted to the drum and not to the pulsator, to rotate the drum and not the pulsator,
in the second position, the coupling is configured with respect to the pulsator driving portion and the drum driving portion so that the power generated by the motor is transmitted to the pulsator and not to the drum, to rotate the pulsator and not the drum, and
in the third position, the coupling is configured with respect to the pulsator driving portion and the drum driving portion so that the power generated by the motor is transmitted to both the pulsator and the drum, to rotate the pulsator and drum together.

17. The washing machine according to claim 16, wherein the clutch assembly is configured to raise and lower the coupling to thereby control the coupling to selectively be in the first position, the second position, or the third position.

18. The washing machine according to claim 16, wherein, when the coupling is in the first position so that the drum is rotated, a rotating direction of the drum is opposite to a rotating direction of the motor.

19. The washing machine according to claim 18, wherein, when the coupling is in the second position so that the pulsator is rotated, a rotating direction of the pulsator is the same as the rotating direction of the motor.

* * * * *